June 10, 1969     S. O. BAILEY     3,449,232
STRESS CORROSION CELL
Filed Sept. 29, 1966
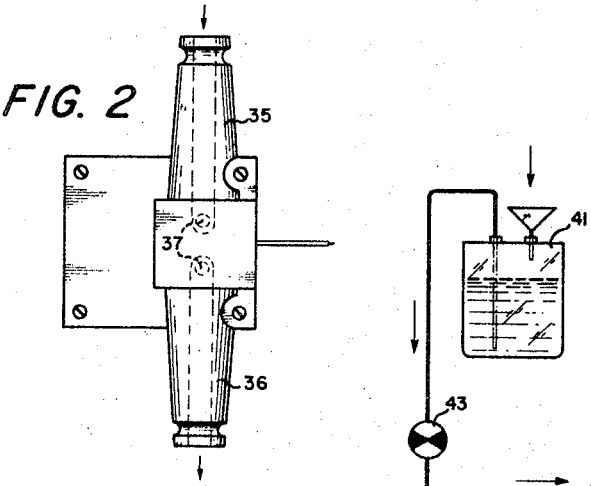
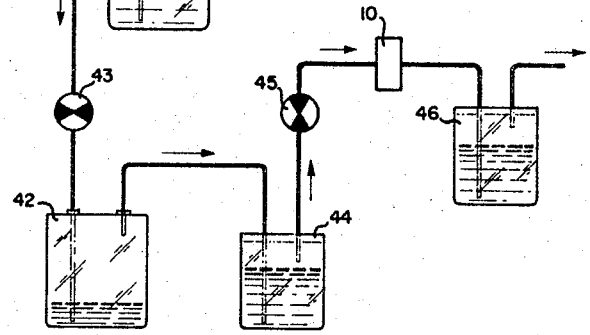
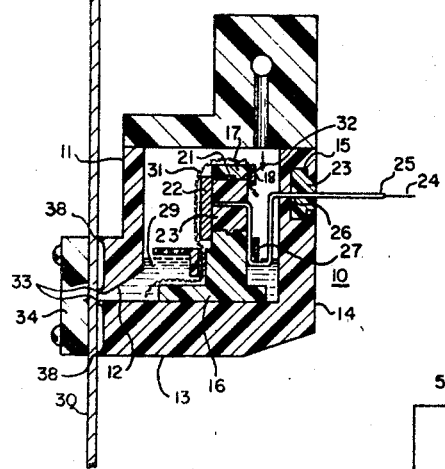
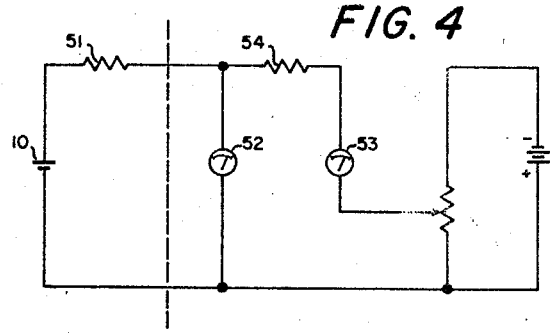
INVENTOR
SHADY O. BAILEY
BY *Melvin L. Crane* AGENT
*[signature]* ATTORNEY

United States Patent Office

3,449,232
Patented June 10, 1969

3,449,232
STRESS CORROSION CELL
Shady O. Bailey, Oxon Hill, Md., assignor to the United States of America as represented by the Secretary of the Navy
Filed Sept. 29, 1966, Ser. No. 583,507
Int. Cl. B01k *3/00*
U.S. Cl. 204—195            6 Claims

The invention described herein may be manufactured and used by or for the Government of the United States of America for governmental purposes without the payment of any royalties thereon or therefor.

The present invention is directed to a stress corrosion measuring device and more particularly to an electrochemical cell for investigating the effects of mechanical stress variations on the corrosion of metals.

Heretofore, testing the susceptibilities of metals to stress corrosion has been mostly concerned with relative grading of stress corrosion characteristics of specimens subjected to electrochemical attacks while supporting mechanical stresses in various environments. An example of such a test is one in which the procedure is to expose a flexed strip or specimen of metal to chemical attack in a marine environment and observing the length of time necessary for the specimen to break into pieces. Another test is that of placing precracked specimens in various environments while supporting mechanically applied stresses. The environment may include an atmosphere of vaporized liquid such as water. After the specimens are exposed and mechanically subjected to loadings, durations of time the loads are supported before mechanical failures are observed. A modification of this test technique provides a means of measuring extension velocities of the initial cracks across the specimen. This provision incorporates a means of measuring changes in the electrical conductivity of the specimens as the cracks propagate. By correlating the changes of electrical conductivity with changes in the cross-sectional area, as the cracks extend, the rate at which cracks propagtae or corrosion occurs may be determined. The level of stresses which will cause the cracks to extend in corrosive environments are levels which could be supported indefinitely without mechanical failures of the specimens in dry air or a vacuum.

The present invention is directed to a device for measuring the effects of changes in the supported mechanical stress levels on corrosion of metals. The device of the present invention particularly utilizes an electrochemical cell in which two electrodes are exposed to an electrolyte wherein conditions of differential aeration are imposed. The electrodes may consist of two pieces of the same metal which are exposed in two separate fashions to an electrolyte for establishing conditions of differential aeration or differential concentrations of chemical agents. Stress corrosion measurements effectively consist of changes in the amount of current generated by the cell, induced by variations of mechanical stress supported by one or both electrodes. Measurements of these variables provide: (1) a method of relative grading the stress corrosion characteristics of metal subjected to electrochemical attacks, (2) determining the chemical and/or mechanical mechanisms which enhance stress corrision, (3) investigate stress corrosion inhibiting methods and/or chemicals, and (4) possibly a means of measuring residual stresses and/or stresses in structural members.

It has been determined that when using electrodes of high-strength steel, measurements of the effects of stress levels on corrosion can be obtained by establishing the proper chemical conditions to cause normal or general corrosion. Naturally when a drop of water rests on the metallic surface of a piece of iron or steel, only a restricted supply of oxygen or air is availbale to the surface area underneath the thickest coverage of water. At this metallic surface the restriction on the supply of oxygen or air is controlled by the amount absorbed by the water. This exposure promotes development of the water covered area into one where metal enters the electrolyte, pitting takes place, or it becomes the anodic area. A cathodic area develops at or near the periphery of the drop where air can come in contact with both the electrolyte and the metal. Localized electric current(s) is/are caused to flow through the electrolyte from the anodic area to the cathodic area thence back through the metal to the anodic area. In accordance with Faraday's electrochemical law, the rate which the metal leaves the anodic surface is determined by the magnitude(s) of the localized current(s). Thus, if the localized current(s) could be effectively measured with reasonable accuracy, the effects of stress levels on corrosion rate(s) could be determined by measuring the changes of the local current(s). Since the localized electric current(s) can not be easily measured, the stress corrosion-cell of the present invention was developed. The device of the present invention is so constructed and assembled such that the steel electrode subjected to changes of stress is the electrode on which an area of dominant anodic reaction occurs, wherein the localized currents through the metal are minimized. Thus, the electrochemical current is caused to flow through the electrolyte to another piece of the same metal separated from that anode.

Within the cell of the present invention is a piece of steel on which a flat surface is covered with a film of electrolyte. A strip of medical gauze or capillary strip carries the electrolyte onto this metal surface and air is forced to circulate past the piece of steel. These metal-to-electrolyte exposure conditions are so created to resemble those existing at the periphery of a water drop on steel where the cathodic area naturally exists. The localized currents on this electrode have been minimized by these metal-to-electrolyte exposure conditions. By having created an anodic area on one piece of steel and a cathodic area on another piece of the same metal, an electrochemical current will flow when there is an electrical conductor carrying current from the cathode to the anode (conventional current flow).

It is therefore, an object of the present invention, to provide a device for measuring the effects of changes in mechanical stress levels on the corrosion of metals.

Another object is to provide a stress corrosion device which is simple in operation and easily assembled for test purposes.

Another object is to provide a device for determining accurately stress corrosion characteristics of metals.

Still another object is to provide a corrosion measuring cell in which the electrochemical reactions are essentially the same as those found in nature.

Yet another object is to provide a small portable device which is easily operated by inexperienced personnel with limited instruction.

Other more specific objects of this invention will become apparent after careful consideration of the following detailed description when taken together with the accompanying drawing, in which:

FIG. 1 is a centralized cross-sectional view illustrating various parts of the device;

FIG. 2 is a top view of the device illustrating hose connectors with internal channels for conducting air or gases into and out a chamber within which an electrode covered with a film of aerated electrolyte is located;

FIG. 3 is a gas-circulation system which may be used for forcing air past the electrode covered with the aerated electrolyte in the device illustrated in FIG. 1 or the stress corrosion cell made in accordance with the present invention.

FIG. 4 illustrates a circuit which may be used for measuring the short circuit current produced by the stress corrosion device.

Referring now to the drawing, there is shown, for illustrative purposes, in FIG. 1, a centralized cross-sectional view of a stress corrosion cell made in accordance with the present invention. As shown, the device comprises a box-like housing 10 made of suitable material such as a fluorinated plastic (Teflon). Suitability of the structural material may be governed by considering desirable physical properties, such as: (1) negligible absorption of water, (2) easily machined for fabrication of parts, (3) a good electrical insulator, (4) mechanically rigid enough for conventional handling, and (5) slightly resilient to compressive forces. Also, suitability of the material may be considered in accordance with desirable chemical properties, namely: (1) chemically inert when exposed to the chemical reactants in the cell and (2) not easily dissolved, thus will not contaminate the chemical reactants. If it is advantageous to visually view or allow light to fall on the chemicals in the inner portion of the stress corrosion cell, modern plastic technology can be utilized for placing panels of glass sealed in the sidewalls of the box-like housing. For purposes of simplicity, the drawing in FIG. 1 does not illustrate nor will there henceforth be references in the following description concerning possible inclusions of transparent or translucent panels in the sidewalls of the box-like housing. As shown in FIG. 1, the front side wall 11 of housing 10 includes an orifice to a channel 12 through the upright side wall wherein the channel is centrally located and is extended outwardly from near the bottom 13 of the box-like housing. The back wall 14 opposite the wall including the channel therein is provided with an aperture 15 near the upper surface thereof, the purpose of which will be described hereinafter. An element or inner structure with a base 16 that fits snugly within the inner chamber in the box-like housing can be made of the same material as the box-like housing (e.g. polytetrafluoroethylene) having the same desirable chemical and physical properties listed heretofore. This insert includes a substantially solid section 17 which extends upwardly toward the top of the housing. The upright portion of the insert is positioned such that it is spaced from the front and rear wall of the housing and is provided with an aperture 18 therethrough in which approximately midway of the aperture there is provided a groove 21 within the wall surface of the aperture. A reference electrode 22 is securely attached to the forward wall of the upright portion of the insert by use of an epoxy 23 or other suitable cement. A secure electrical contact is made to the reference electrode by use of an electrical conductive wire 24 which is covered by snugly fitting tubing 25 made of Teflon that can extend from the electrode thence directed out through a small aperture 26 in the rear wall of the housing and cover nearly the full length of the wire. Anchor-like retention of the electrically insulated wire is secured by use of a clamp 27 attached to the rear side of the upright portion of the insert. The aperture within the upright portion of the insert and the aperture in the rear wall of the housing are filled with an epoxy or other suitable cement. The cement seals the opening in the rear wall of the housing to prevent any electrolyte or air from passing therethrough and around the aforementioned electric wire and seal the back part of the reference electrode so that the electrolyte is prevented from making contact with the back part of the reference electrode or the electrical contact between the electrical wire and the electrode. A porous material 31 such as medical gauze or capillary strip is secured to the upright portion of the insert near the top and on the back side thereof by a clamp 32 secured to the insert and then the capillary strip is passed over top of the insert down over the surface of the reference electrode and thence along the surface of the insert into a solution on the bottom of the inner chamber within the housing. A facing can be made an added integral part of the front wall of the housing and it provides two mechanical stabilizing ridges 38, 38 of which one is located at the upper edge and the other at the lower edge thereof. Centrally located in the facing are protruding lips 33 that form edges of the orifice to the channel that extend into the inner chamber within the housing. The lips provide a means of preventing leakage of the electrolyte and preventing an infusion of outside air to the metal-to-electrolyte exposure area on the test specimen 30 when the housing is clamped onto the test specimen. A clamp 34 having a cut-out centrally located thereof is provided to secure the corrosion test device onto the test specimen and the cut-out portion therein is formed to fit around the test specimen.

FIG. 2 illustrates the top portion of the housing which is placed in position over top of the housing and is provided with an air or gas inlet 35 and an air or gas outlet 36 with suitable passages 37 which extend internally through the top portion downwardly toward the inner chamber in the housing. Thus, air or gas entering through the inlet will pass downwardly into the housing and will exit through the air or gas outlet.

In use of the stress corrosion device, the reference electrode (cathode) is placed in circulating air where aeration of the film of electrolyte coverage can occur; therefore, a circulating system for forcing water saturated air through the cell is shown schematically in FIG. 3. As shown in FIG. 3, a container 41 filled with water is positioned above another container 42 filled with air. Between the upper and lower container a tubular connection is made through which water is forced into the lower container wherein the water filling the lower container forces air out of the lower container. A water-flow regulator 43 placed in series with the aforementioned tubular connection can provide a coarse control of the rate which air is forced out of the lower container. The air passes from the lower container through a suitable air line into a second chamber 44 partially filled with water such that air passes through the water in the last mentioned chamber. Water saturated air is trapped in the upper portion of the chamber from whence the water saturated air passes through a tubular passage into the air inlet on top of the stress corrosion cell housing. An air passage rate regulator 45 is placed in series with this tubular connection for a vernier air flow rate control that can be located in proximity of the cell. After the water saturated air enters the inlet port in the top piece on top of the housing, the air passes downwardly into the inner chamber in the housing where the electrolyte film is aerated on the reference electrode. Then the air passes through the outlet port in the top piece on the corrosion cell thence through suitable tubing into another chamber 46 partially filled with water. The water in this chamber acts as a valve for letting air flow out of the stress corrosion cell but the valve will not allow air from the atmosphere to flow back into the cell.

Usually the cell contains an electrolyte which consists of a large percentage of water as a solvent in solution with a salt. If outside air not saturated with water is circulated through the cell, the water in the electrolyte will gradually evaporate thereby increasing the salt concentration in solution. Thus, the reference electrode covered with a film of electrolyte is aerated with a continuously fresh supply of water saturated air. The inclusion of the air circulation system shown in FIG. 3 is for illustrative purposes only and to simply imply that long term use of the cell is possible when such an air circulation is utilized.

FIG. 4 illustrates a circuit which may be utilized for measuring the short-circuit current produced by the stress corrosion device. Measurements of the short-circuit current should provide useful data concerning the stress corrosion characteristics of metals because of the fact that when drops of water are on the bare surfaces of a metal, the naturally formed cells are producing shortcircuited currents (localized currents). Referring to the circuit represented in FIG. 4, the cell with its internal resistance 51 is placed in front of the dashed line. A sensitive galvanometer 52 is connected directly to terminals of the cell. A source of variable current with an ampere meter 53 in series is connected to the galvanometer 52 so that through the galvanometer the current from the stress corrosion device opposes the current furnished by the variable source. When the galvanometer indicates no current flow, the aforementioned ampere meter indicates the amount of short-circuit current produced by the cell. An appreciable potential difference which can be easily measured may be produced by inserting a resistor 54 in series with the ampere meter and the galvanometer.

Assembly and operation of the device of the present invention is as follows; the housing is formed with an inner chamber, from the inner chamber a channel extends to an orifice in the facing on the front wall of the housing, and an aperture passes through the back wall. The reference electrode with a wire attached is secured to an insert by use of epoxy cement which also fills an aperture in the insert behind the reference electrode. A capillary strip (e.g. coarsely woven medical gauze) is secured to the top of the insert and placed against the surface of the reference electrode. Then the base of the insert is placed on the bottom of the inner chamber within the housing. From the reference electrode the wire is then passed through the aperture in the back wall of the housing and the remaining space in the aperture is filled with epoxy cement for sealing against leakage of air. The device is then clamped against the test specimen and subsequently some electrolyte is poured into the inner chambr in the housing. In the device, the electrolyte fills the chamber to some convenient level leaving unfilled space below the reference electrode. After the electrolyte is poured into the chamber within the housing, the top is secured to the housing, following which the device is immediately connected into a gas circulation system as depicted in FIG. 3. By making connection to the test specimen and utilizing the electrical lead from the reference electrode the device can be connected into an electrical system such as shown in FIG. 4. The stress corrosion device is operational after the test specimen is mechanically coupled with suitable equipment for subjecting the test specimen to changes of supported stresses. The resulting effect is indicated by the ampere meter connected in series with the variable current source and the galvanometer shown in FIG. 4, particularly when the condition of zero current passing through the galvanometer is maintained by adjusting the amount of current flowing from the variable current source.

The electrolyte contacts the test specimen only on the area enclosed by the protruding lips at the orifice of the channel leading from the inner chamber to the facing on the front wall of the housing. The lips contact the surface of the test specimen forming an impervious barrier against leakage of air so that the area is exclusively exposed to the electrolyte. The capillary strip placed against the reference electrode extends downwardly into the electrolyte thus, allowing the electrolyte to feed upwardly by capillary attraction onto the front surface of the reference electrode. Since the capillary strip is coarsely woven, a film of electrolyte covers the reference electrode where the film is aerated by air circulating through the top piece covering the cell. It is obvious to those skilled in the art that rather than circulating air past the reference electrode (cathode), it is possible to circulate only a gas such as oxygen past the cathode to determine the action of such gases on the cathode. By controlling the percentages of gas constituents in mixtures used for aeration on the cathode, it may be possible to determine the effect of each gas constituent and/or gas mixtures on stress corrosion.

The stress corrosion cell of the present invention may be used to obtain a better understanding of the role of different chemical agents in both natural conditions of the exposure by variations of concentrations of, (1) salt or salts in the electrolyte, (2) liquid or liquids in the electrolyte, (3) gases used for aeration of the references electrode, and (4) the different metals and alloys from which the electrodes have been fabricated.

Besides variations of concentration of the chemical agents other information may be gained by changing the temperatures of the cell, connecting electrical resistors of various ohmic valves in series with the cell and the galvanometer (FIG. 4), changes of aeration gas pressure, using electrodes of the same or different alloys with different heat treatments and/or of different hardness values, addition of corrosion inhibitors in the electrolyte, and comparing laboratory controlled conditions with natural service conditions under which the metals are exposed. Thus, this can be seen that the stress corrosion device of the present invention may be used for obtaining information in various areas of research.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A corrosion test device which comprises:

a housing, said housing being adapted to contain an electrolyte in the lower part thereof;

an inlet and an outlet in the upper portion of said housing for feeding air into and out of the interior of said housing;

said housing including an orifice in one side wall near the bottom of said housing;

means associated with said housing for securing said test device to a test eletcrode with the test electrode extending along said orifice in said side wall in a fluid tight contact relationship;

a reference electrode secured within said housing and spaced from the walls of said housing, said reference electrode being positioned in such a manner that it does not dip into the electrolyte; and a porous material secured over the outer surface of said reference electrode and adapted to extend into the electrolyte, said porous material being capable of conducting electrolyte by capillary action;

whereby an electrolyte placed in said housing of said test device contacts the test electrode and provides ionic conduction to said reference electrode by way of said porous material secured over said reference electrode.

2. A corrosion test device as claimed in claim 1, wherein:

said housing includes an aperture in a wall, and an electrically insulated wire electrically connected with said reference electrode and passed out through said aperture within said housing wall.

3. A corrosion test device as claimed in claim 1, wherein:

said material is of coarsely woven fabric.

4. A corrosion test device as claimed in claim 1, wherein:

said housing includes ridges around the peripheral edges of said orifice to provide a fluid seal between said housing and said test electrode.

5. A corrosion test device as claimed in claim 1, wherein:

an insert is secured within said housing and extends upwardly from the bottom of said housing, said reference electrode is secured to said insert near the upper end thereof and extends downwardly toward the bottom of said housing, and said porous material is secured to the upper end portion of said insert.

6. A corrosion test device as claimed in claim 5, wherein:

said reference electrode has an electrical connection on one side sealed against contact with any fluid within said housing.

References Cited

UNITED STATES PATENTS

| | | | |
|---|---|---|---|
| 3,065,151 | 11/1962 | Schaschl et al. | 204—1 |
| 3,098,801 | 7/1963 | Marsh et al. | 204—1 |
| 3,197,388 | 7/1965 | Marsh et al. | 204—1 |
| 3,208,926 | 9/1965 | Eckfeldt | 204—195 |
| 3,250,689 | 5/1966 | Seyl | 204—1 |
| 3,293,155 | 12/1966 | Stone | 204—1 |
| 3,301,775 | 1/1967 | Tsien | 204—195 |
| 3,331,021 | 7/1967 | Marsh et al. | 204—195 XR |
| 3,337,440 | 8/1967 | Nestor | 204—195 |

OTHER REFERENCES

Shreir, L. L., "Corrosion" vol. 2, pp. 20.3–20.98, (1963).

JOHN H. MACK, *Primary Examiner.*

G. L. KAPLAN, *Assistant Examiner.*

U.S. Cl. X.R.

204—1; 324—29